(12) United States Patent
Ouyang

(10) Patent No.: US 9,312,771 B2
(45) Date of Patent: Apr. 12, 2016

(54) SINGLE INDUCTOR MULTIPLE OUTPUT BUCK CONVERTER AND CONTROL METHOD THEREOF

(71) Applicant: Chengdu Monolithic Power Systems Co., Ltd., Chengdu (CN)

(72) Inventor: Qian Ouyang, Hangzhou (CN)

(73) Assignee: Chengdu Monolithic Power Systems Co., Ltd., Chengdu (CN)

(*) Notice: Subject to any disclaimer, the term of this patent is extended or adjusted under 35 U.S.C. 154(b) by 0 days.

(21) Appl. No.: 14/588,211

(22) Filed: Dec. 31, 2014

(65) Prior Publication Data

US 2015/0188434 A1 Jul. 2, 2015

(30) Foreign Application Priority Data

Dec. 31, 2013 (CN) .......................... 2013 1 0751101

(51) Int. Cl.
*H02M 3/158* (2006.01)
*H02M 1/00* (2007.01)

(52) U.S. Cl.
CPC ........ *H02M 3/158* (2013.01); *H02M 2001/009* (2013.01)

(58) Field of Classification Search
CPC ......................... H02M 3/158; H02M 2001/009
See application file for complete search history.

(56) References Cited

U.S. PATENT DOCUMENTS

| 6,222,352 B1* | 4/2001 | Lenk ............................. 323/267 |
| 2005/0264271 A1* | 12/2005 | Lam et al. ..................... 323/282 |
| 2012/0286576 A1* | 11/2012 | Jing et al. ........................ 307/43 |
| 2013/0162228 A1 | 6/2013 | Menegoli et al. |
| 2013/0234513 A1* | 9/2013 | Bayer .............................. 307/31 |
| 2014/0285014 A1* | 9/2014 | Calhoun et al. ................. 307/31 |

* cited by examiner

*Primary Examiner* — Jue Zhang
(74) *Attorney, Agent, or Firm* — Perkins Coie LLP

(57) ABSTRACT

A single inductor multiple output buck converter includes an inductor having a first terminal and a second terminal, a first switch coupled between an input voltage and the first terminal of the inductor, a second switch coupled between the first terminal of the inductor and a reference ground, a third switch coupled between the second terminal of the inductor and a first output voltage, and a fourth switch coupled between the second terminal of the inductor and a second output voltage. A first feedback signal indicative of the first output voltage is compared with a first reference signal to generate a first comparison signal. A second feedback signal indicative of the second output voltage is compared with a second reference signal to generate a second comparison signal. Then which one of the first comparison signal and the second comparison signal is asserted first is detected, and the first to fourth switches are controlled based on the detection result.

13 Claims, 7 Drawing Sheets

SINGLE INDUCTOR MULTIPLE OUTPUT BUCK CONVERTER AND CONTROL METHOD THEREOF

CROSS-REFERENCE TO RELATED APPLICATION(S)

This application claims the benefit of CN application 201310751101.8 filed on Dec. 31, 2013, and incorporated herein by reference.

STATEMENT REGARDING FEDERALLY SPONSORED RESEARCH

Not Applicable

APPENDICES

Not Applicable

TECHNICAL FIELD

The present invention generally relates to electronic circuits, and more particularly but not exclusively to single inductor multiple output buck converters and control methods thereof.

BACKGROUND

A lot of systems, such as main boards, need a plurality of bus voltage, e.g., 3.3V and 2V. A traditional solution is using a plurality of buck converters, wherein each of the buck converters includes a control IC, two switches, an inductor, an output capacitor and other auxiliary elements. These elements, especially the inductor, really cost. So, a multiple output solution with simpler structure and lower cost is required.

SUMMARY

To solve the problem mentioned above, a single inductor multiple output buck converter with constant on time control is proposed. Each output voltage is compared with a corresponding reference value. Then all of the output voltage are regulated in a time sharing method based on the comparison results. Since these is only one inductor in this converter, the cost is pretty low.

Embodiments of the present invention are directed to a control method of a single inductor multiple output buck converter. The single inductor multiple output buck converter comprises an inductor having a first terminal and a second terminal, a first switch coupled between an input voltage and the first terminal of the inductor, a second switch coupled between the first terminal of the inductor and a reference ground, a third switch coupled between the second terminal of the inductor and a first output voltage, a fourth switch coupled between the second terminal of the inductor and a second output voltage, a first capacitor coupled between the first output voltage and the reference ground, and a second capacitor coupled between the second output voltage and the reference ground. The control method comprises: generating a first feedback signal based on the first output voltage; generating a second feedback signal based on the second output voltage; comparing the first feedback signal with a first reference signal and generating a first comparison signal; comparing the second feedback signal with a second reference signal and generating a second comparison signal; detecting which one of the first comparison signal and the second comparison signal is asserted first; and controlling the first switch, second switch, third switch and fourth switch based on the detection result. When the first comparison signal is asserted earlier than the second comparison signal, the first switch and the third switch are turned on, the second switch and the fourth switch are turned off, wherein the first switch will be turned off and the second switch will be turned on once the on time of the first switch reaches a first time threshold. When the second comparison signal is asserted earlier than the first comparison signal, the first switch and the fourth switch are turned on, the second switch and the third switch are turned off, wherein the first switch will be turned off and the second switch will be turned on once the on time of the first switch reaches a second time threshold.

Embodiments of the present invention are also directed to a control circuit used in a single inductor multiple output buck converter. The control circuit comprises a first comparing circuit, a second comparing circuit and a logic circuit. The first comparing circuit has a first input terminal, a second input terminal and an output terminal, wherein the first input terminal is configured to receive a first feedback signal indicative of the first output voltage, the second input terminal is configured to receive a first reference signal, and wherein the first comparing circuit compares the first feedback signal with the first reference signal and generates a first comparison signal at the output terminal. The second comparing circuit has a first input terminal, a second input terminal and an output terminal, wherein the first input terminal is configured to receive a second feedback signal indicative of the second output voltage, the second input terminal is configured to receive a second reference signal, and wherein the second comparing circuit compares the second feedback signal with the second reference signal and generates a second comparison signal at the output terminal. The logic circuit is coupled to the output terminals of the first comparing circuit and the second comparing circuit, wherein the logic circuit detects which one of the first comparison signal and the second comparison signal is asserted first, and wherein based on the detection result, the logic circuit generates a first driving signal, a second driving signal, a third driving signal and a fourth driving signal to respectively control the first switch, second switch, third switch and fourth switch. When the first comparison signal is asserted earlier than the second comparison signal, the logic circuit turns on the first switch and the third switch, turns off the second switch and the fourth switch, wherein the logic circuit will turn off the first switch and turn on the second switch once the on time of the first switch reaches a first time threshold. When the second comparison signal is asserted earlier than the first comparison signal, the logic circuit turns on the first switch and the fourth switch, turns off the second switch and the third switch, wherein the logic circuit will turn off the first switch and turn on the second switch once the on time of the first switch reaches a second time threshold.

Embodiments of the present invention are further directed to a single inductor multiple output buck converter configured to provide a plurality of output voltage. The converter comprises: an inductor having a first terminal and a second terminal; a first switch coupled between an input voltage and the first terminal of the inductor; a second switch coupled between the first terminal of the inductor and a reference ground; a plurality of output switches with each of the plurality of output switches coupled between the second terminal of the inductor and the corresponding output voltage; a plurality of output capacitors with each of the plurality of capacitors coupled between the corresponding output voltage and the reference ground; a plurality of feedback circuits generating a plurality of feedback signals, wherein each of the plurality of feedback circuits is configured to generate a corresponding feedback signal indicative of the corresponding output voltage; a plurality of comparing circuits generating a plurality of comparison signals, wherein each of the plurality of comparing circuits is configured to compare the corresponding feedback signal with a corresponding reference signal and generate a corresponding comparison signal; and a logic circuit coupled to the plurality of comparing circuits, wherein the logic circuit detects which one of the plurality of comparison signals is asserted first, and controls the first switch, second switch and the plurality of output switches based on the detection result.

BRIEF DESCRIPTION OF THE DRAWINGS

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
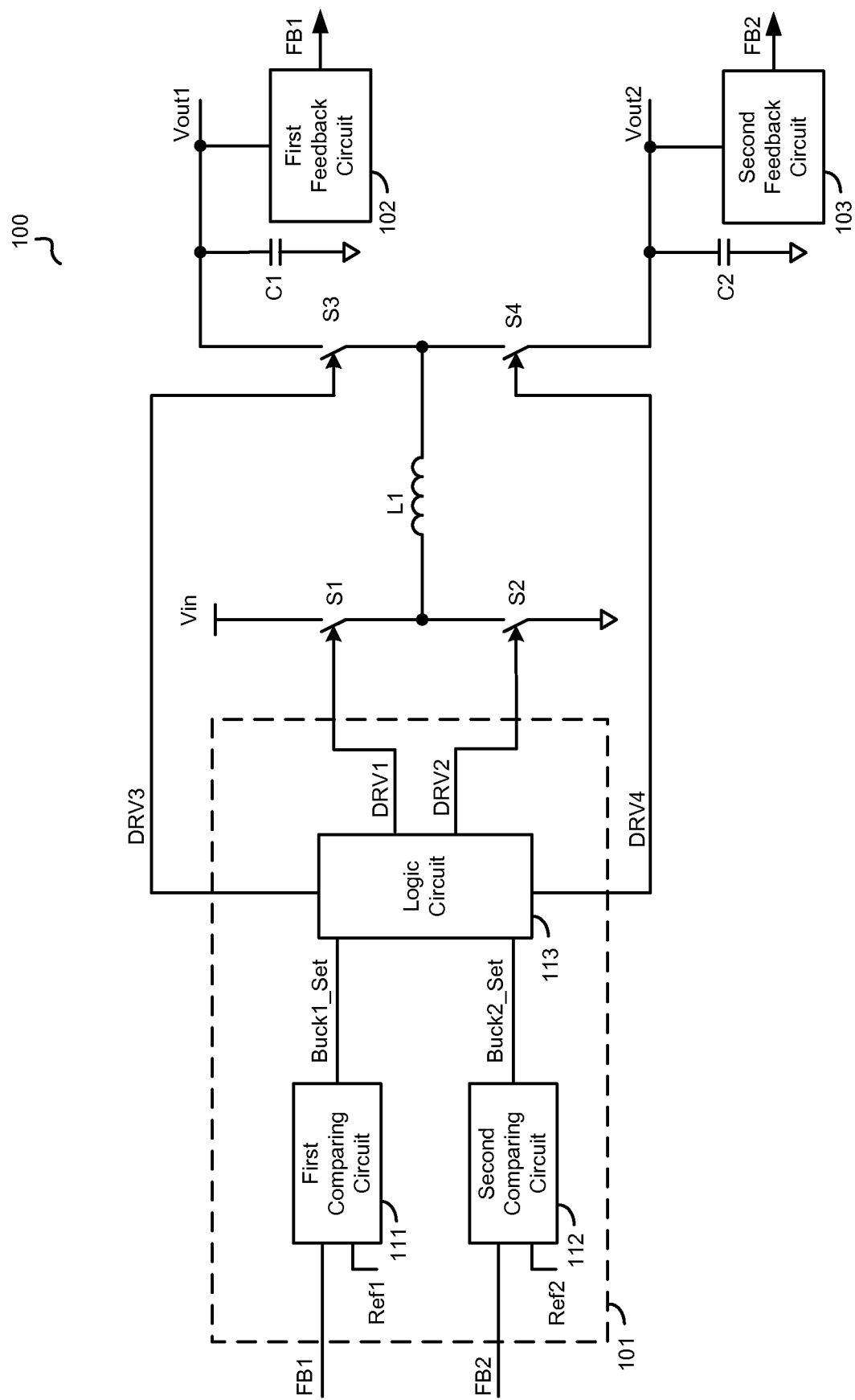
FIG. 1 illustrates a block diagram of a single inductor multiple output buck converter 100 in accordance with an embodiment of the present invention.

FIG. 1 illustrates a block diagram of a single inductor multiple output buck converter 100 in accordance with an embodiment of the present invention. The converter 100 comprises an inductor L1, a first switch S1, a second switch S2, a third switch S3, a fourth switch S4, a first capacitor C1, a second capacitor C2, a control circuit 101, a first feedback circuit 102 and a second feedback circuit 103. The inductor L1 has a first terminal and a second terminal. The first switch S1 is coupled between an input voltage Vin and the first terminal of the inductor L1. The second switch S2 is coupled between the first terminal of the inductor L1 and a reference ground. The third switch S3 is coupled between the second terminal of the inductor L1 and a first output voltage Vout1. The fourth switch S4 is coupled between the second terminal of the inductor L1 and a second output voltage Vout2. The first capacitor C1 is coupled between the first output voltage Vout1 and the reference ground. The second capacitor C2 is coupled between the second output voltage Vout2 and the reference ground. As shown in FIG. 1, when the third switch S3 is on and the fourth switch S4 is off, the switches S1-S3, the inductor L1 and the first capacitor C1 forms a first buck converter BUCK1 to regulate the first output voltage Vout1. When the third switch S3 is off and the fourth switch S4 is on, the switches S1, S2, S4, the inductor L1 and the second capacitor C2 forms a second buck converter BUCK2 to regulate the second output voltage Vout2.

The first feedback circuit 102 has an input terminal and an output terminal, wherein the input terminal is configured to receive the first output voltage Vout1, and wherein based on the first output voltage Vout1, the first feedback circuit 102 generates a first feedback signal FB1 at the output terminal. The second feedback circuit 103 has an input terminal and an output terminal, wherein the input terminal is configured to receive the second output voltage Vout2, and wherein based on the second output voltage Vout2, the second feedback circuit 103 generates a second feedback signal FB2 at the output terminal. The first feedback circuit 102 and the second feedback circuit 103 may both be realized by resistor dividers, or just leads. In the latter situation, the first feedback signal FB1 is equal to the first output voltage Vout1, and the second feedback signal FB2 is equal to the second output voltage Vout2.

The control circuit 101 comprises a first comparing circuit 111, a second comparing circuit 112 and a logic circuit 113. The first comparing circuit 111 has a first input terminal, a second input terminal and an output terminal, wherein the first input terminal is coupled to the output terminal of the first feedback circuit 102, the second input terminal is configured to receive a first reference signal Ref1. The first comparing circuit 111 compares the first feedback signal FB1 with the first reference signal Ref1 and generates a first comparison signal Buck1_Set at the output terminal. The second comparing circuit 112 has a first input terminal, a second input terminal and an output terminal, wherein the first input terminal is coupled to the output terminal of the second feedback circuit 103, the second input terminal is configured to receive a second reference signal Ref2. The second comparing circuit 112 compares the second feedback signal FB2 with the second reference signal Ref2 and generates a second comparison signal Buck2_Set at the output terminal.

The logic circuit 113 is coupled to the output terminals of the first comparing circuit 111 and the second comparing circuit 112, wherein based on the first comparison signal Buck1_Set and the second comparison signal Buck2_Set, the logic circuit 113 generates driving signals DRV1-DRV4 to respectively control the switches S1~S4.

If the first comparison signal Buck1_Set is asserted earlier than the second comparison signal Buck2_Set, which means the time point at which the first feedback signal FB1 reduces to reach the first reference signal Ref1 is earlier than the time point at which the second feedback signal FB2 reduces to reach the second reference signal Ref2, the first buck converter will work normally and the second buck converter will stop working. The logic circuit 113 will turn on the first switch S1 and the third switch S3, turn off the second switch S2 and the fourth switch S4. The logic circuit 113 will also turn off the first switch S1 and turn on the second switch S2 when the on time of the first switch S1 reaches a first time threshold TON1. The first time threshold TON1 may be a constant value, or a variable value related to the input voltage Vin and the first output voltage Vout1.

If the second comparison signal Buck2_Set is asserted earlier than the first comparison signal Buck1_Set, which means the time point at which the second feedback signal FB2 reduces to reach the second reference signal Ref2 is earlier than the time point at which the first feedback signal FB1 reduces to reach the first reference signal Ref1, the first buck converter will stop working and the second buck converter will work normally. The logic circuit 113 will turn on the first switch S1 and the fourth switch S4, turn off the second switch S2 and the third switch S3. The logic circuit 113 will also turn off the first switch S1 and turn on the second switch S2 when the on time of the first switch S1 reaches a second time threshold TON2. The second time threshold TON2 may be a constant value, or a variable value related to the input voltage Vin and the second output voltage Vout2.

Detailed operation of the converter 100 will be described with reference to FIG. 2 which illustrates a state diagram of the single inductor multiple output buck converter 100 in accordance with an embodiment of the present invention. It comprises state S201~S205.

In S201, the converter 100 starts up. The switches S1~S4 are all off, the first buck converter and the second buck converter both do not work. If the first comparison signal Buck1_Set is asserted earlier than the second comparison signal Buck2_Set, the converter 100 will enter into S202. Else if the second comparison signal Buck2_Set is asserted earlier than the first comparison signal Buck1_Set, the converter 100 will enter into S204.

In S202, the first buck converter works and the second buck converter does not work. The switches S1 and S3 are turned on, the switches S2 and S4 are turned off. Besides, an on timer counting the on time of the first switch S1 is started. When the on time of the first switch S1 reaches the first time threshold TON1, the converter 100 enters into S203.

In S203, the first buck converter works and the second buck converter does not work. The first switch S1 is turned off, the second switch S2 is turned on, the status of the switches S3 and S4 are remained. If the first comparison signal Buck1_Set is asserted earlier than the second comparison signal Buck2_Set in S203, the converter 100 will resume to S202. Else if the second comparison signal Buck2_Set is asserted earlier than the first comparison signal Buck1_Set, the converter 100 will enter into S204.

In S204, the first buck converter does not work and the second buck converter works. The switches S1 and S4 are turned on, the switches S2 and S3 are turned off. Besides, the on timer counting the on time of the first switch S1 is started. When the on time of the first switch S1 reaches the second time threshold TON2, the converter 100 enters into S205.

In S205, the first buck converter does not work and the second buck converter works. The first switch S1 is turned off, the second switch S2 is turned on, the status of the switches S3 and S4 are remained. If the first comparison signal Buck1_Set is asserted earlier than the second comparison signal Buck2_Set in S205, the converter 100 will enter into S202. Else if the second comparison signal Buck2_Set is asserted earlier than the first comparison signal Buck1_Set, the converter 100 will resume to S204.

In an embodiment, to prevent the interference of noise, the first switch S1 can be turned on only after its off time reaches a minimum off time threshold. In some embodiments, to avoid over current, the current IL flowing through the inductor L1 is compared with a current limit value Ilim, and the first switch S1 can only be turned on when the current IL is smaller than the current limit value Ilim.

Figure 2:
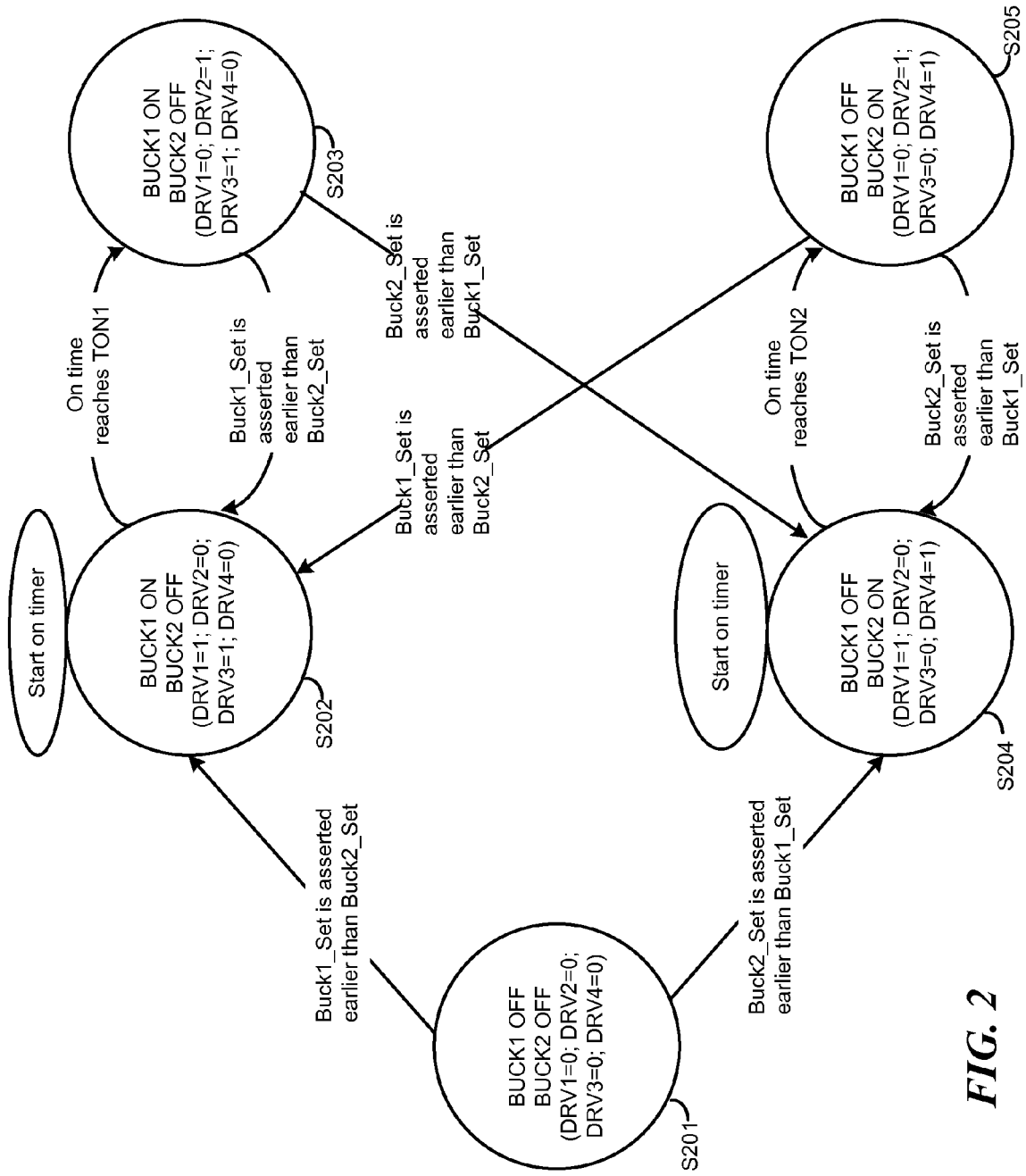
FIG. 2 illustrates a state diagram of the single inductor multiple output buck converter 100 in accordance with an embodiment of the present invention.

As shown in FIG. 2, the first buck converter and the second buck converter work in time-sharing method based on the first comparison signal Buck1_Set and the second comparison signal Buck2_Set. So the first output voltage Vout1 and the second output voltage Vout2 can both be regulated.

Figure 3:
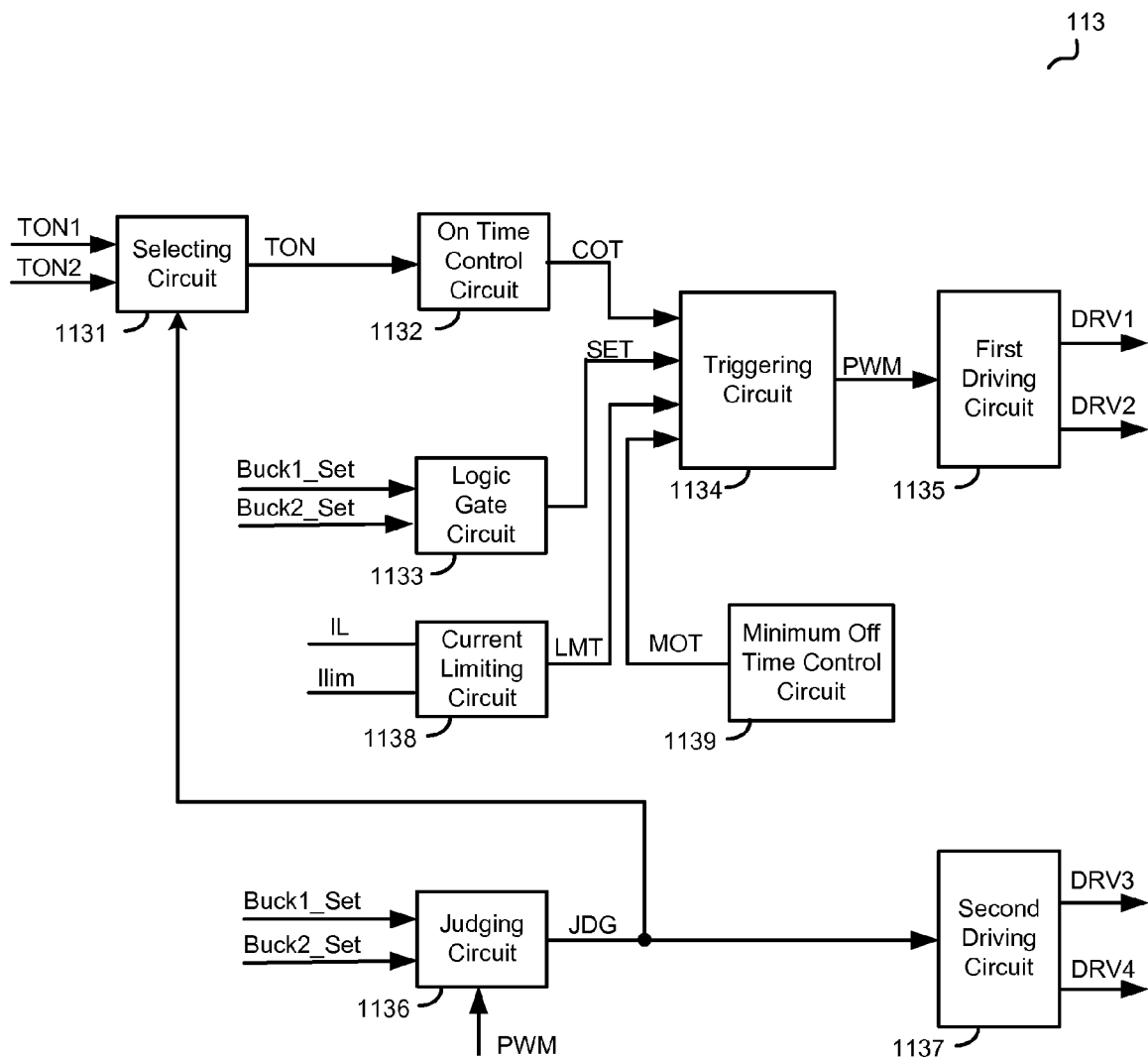
FIG. 3 illustrates a block diagram of the logic circuit 113 in accordance with an embodiment of the present invention.

FIG. 3 illustrates a block diagram of the logic circuit 113 in accordance with an embodiment of the present invention. The logic circuit 113 includes a selecting circuit 1131, an on time control circuit 1132, a logic gate circuit 1133, a triggering circuit 1134, a first driving circuit 1135, a judging circuit 1136 and a second driving circuit 1137.

The judging circuit 1136 has a first input terminal, a second input terminal and an output terminal, wherein the first input terminal is coupled to the output terminal of the first comparing circuit to receive the first comparison signal Buck1_Set, the second input terminal is coupled to the output terminal of the second comparing circuit to receive the second comparison signal Buck2_Set. The judging circuit 1136 detects which one of the first comparison signal Buck1_Set and the second comparison signal Buck2_Set is asserted first, and generates a judge signal JDG at the output terminal.

The selecting circuit 1131 has a first input terminal, a second input terminal, a third input terminal and an output terminal, wherein the first input terminal is configured to receive the first time threshold TON1, the second input terminal is configured to receive the second time threshold TON2, the third input terminal is coupled to the output terminal of the judging circuit 1136 to receive the judge signal JDG. Based on the judge signal JDG, the selecting circuit 1131 provides the first time threshold TON1 or the second time threshold TON2 to the output terminal as an on time threshold TON.

The on time control circuit 1132 has an input terminal and an output terminal, wherein the input terminal is coupled to the output terminal of the selecting circuit 1131 to receive the on time threshold TON, and wherein based on the on time threshold TON, the on time control circuit 1132 generates an on time control signal COT at the output terminal.

The logic gate circuit 1133 has a first input terminal, a second input terminal and an output terminal, wherein the first input terminal is couple to the output terminal of the first comparing circuit to receive the first comparison signal Buck1_Set, the second input terminal is coupled to the output terminal of the second comparing circuit to receive the second comparison signal Buck2_Set. Based on the first comparison signal Buck1_Set and the second comparison signal Buck2_Set, the logic gate circuit 1133 generates a gate output signal SET at the output terminal.

The triggering circuit 1134 has a first input terminal, a second input terminal and an output terminal, wherein the first input terminal is couple to the output terminal of the on time control circuit 1132 to receive the on time control signal COT, the second input terminal is coupled to the output terminal of the logic gate circuit 1133 to receive the gate output signal SET. Based on the on time control signal COT and the gate output signal SET, the triggering circuit 1134 generates a switch control signal PWM at the output terminal.

The first driving circuit 1135 has an input terminal, a first output terminal and a second output terminal, wherein the input terminal is coupled to the output terminal of the triggering circuit 1134 to receive the switch control signal PWM. Based on the switch control signal PWM, the first driving circuit 1135 respectively generates the driving signals DRV1 and DRV2 at the first output terminal and the second output terminal.

The second driving circuit 1137 has an input terminal, a first output terminal and a second output terminal, wherein the input terminal is coupled to the output terminal of the judging circuit 1136 to receive the judge signal JDG. Based on the judge signal JDG, the second driving circuit 1137 respectively generates the driving signals DRV3 and DRV4 at the first output terminal and the second output terminal.

In an embodiment, the judging circuit 1136 is further coupled to the output terminal of the triggering circuit 1134 to receive the switch control signal CTRL. Based on the switch control signal CTRL, the judging circuit 1136 detects which comparison signal is asserted first only when the first switch S1 is off.

When the judging circuit 1136 detects that the first comparison signal Buck1_Set is asserted earlier than the second comparison signal Buck2_Set, the selecting circuit 1131 selects the first time threshold TON1 as the on time threshold TON. The second driving circuit 1137 turns on the third switch S3 and turns off the fourth switch S4. At the same time, the triggering circuit 1134 is triggered. The first driving circuit 1135 turns on the first switch S1 and turns off the second switch S2, until the on time of the first switch S1 reaches the first time threshold TON1.

When the judging circuit 1136 detects that the second comparison signal Buck2_Set is asserted earlier than the first comparison signal Buck1_Set, the selecting circuit 1131 selects the second time threshold TON2 as the on time threshold TON. The second driving circuit 1137 turns off the third switch S3 and turns on the fourth switch S4. At the same time, the triggering circuit 1134 is triggered. The first driving circuit 1135 turns on the first switch S1 and turns off the second switch S2, until the on time of the first switch S1 reaches the second time threshold TON2.

In an embodiment, the logic circuit 113 further comprises a minimum off time control circuit 1139 generating a minimum off time control signal MOT. The minimum off time control signal MOT is used to control the minimum off time of the first switch S1. The triggering circuit 1134 receives the minimum off time control signal MOT, and generates the switch control signal PWM based on the gate output signal SET, minimum off time control signal MOT and on time control signal COT.

In an embodiment, the logic circuit 113 further comprises a current limiting circuit 1138 configured to limit the current IL flowing through the inductor L1. The current limiting circuit 1138 compares the current IL with the current limit value Him and generates a current limiting signal LMT. The triggering circuit 1134 receives the current limiting signal LMT, and generates the switch control signal PWM based on the gate output signal SET, on time control signal COT, minimum off time control signal MOT and current limiting signal LMT.

Figure 4:
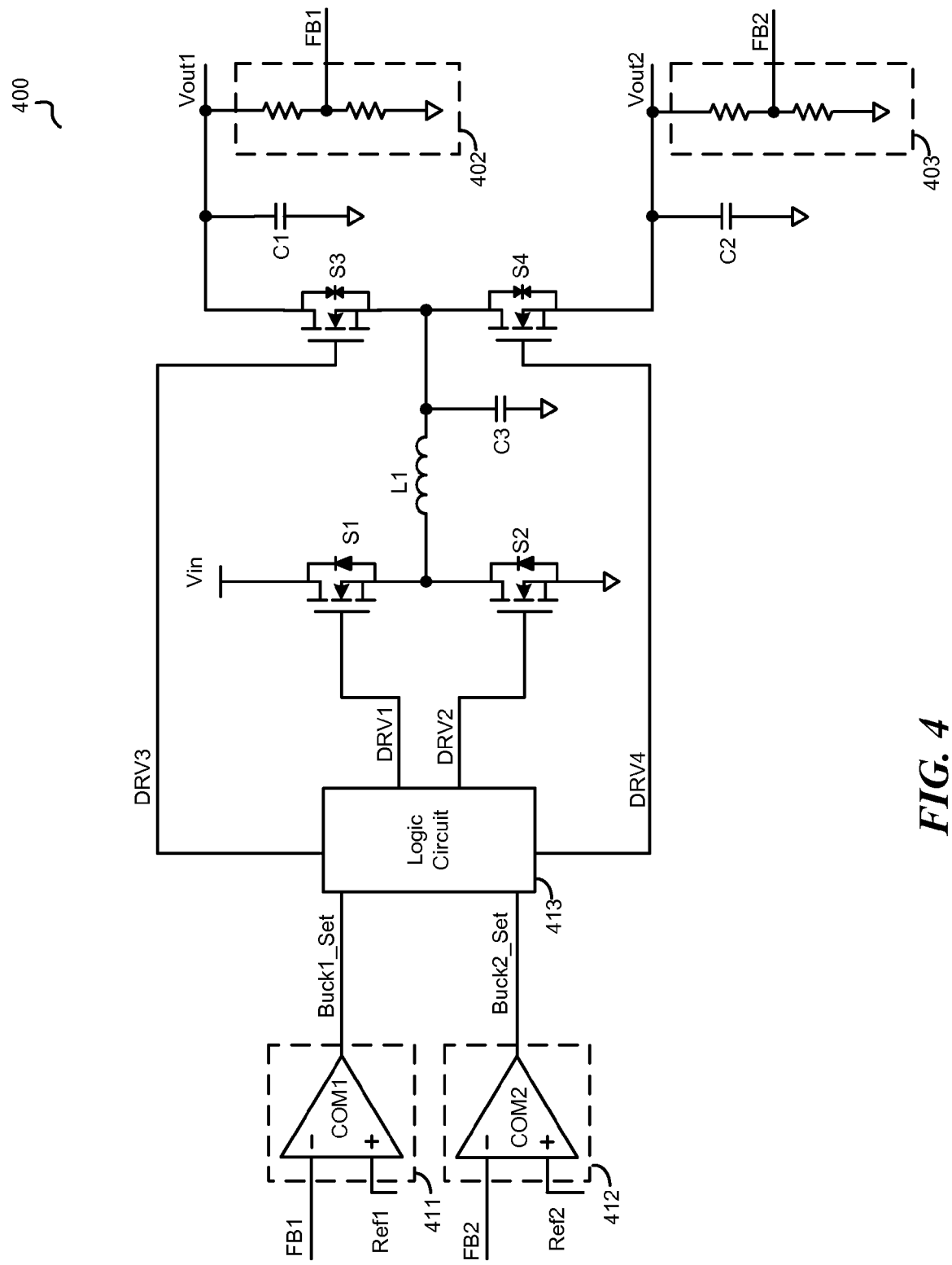
FIG. 4 schematically illustrates a single inductor multiple output buck converter 400 in accordance with an embodiment of the present invention.

FIG. 4 schematically illustrates a single inductor multiple output buck converter 400 in accordance with an embodiment of the present invention. Compared with the converter 100 shown in FIG. 1, the converter 400 further comprises a third capacitor C3 coupled between the second terminal of the inductor L1 and the reference ground. In the embodiment shown in FIG. 4, the switches S1-S4 are all n-type MOSFETs. The first comparing circuit 411 and the second comparing circuit 412 respectively comprise comparators COM1 and COM2. The first feedback circuit 402 and the second feedback circuit 403 both comprise a resistor divider. To prevent short circuit of the two output voltage, the switches S3 and S4 comprise diodes reversely connected to their body diodes.

Figure 5:
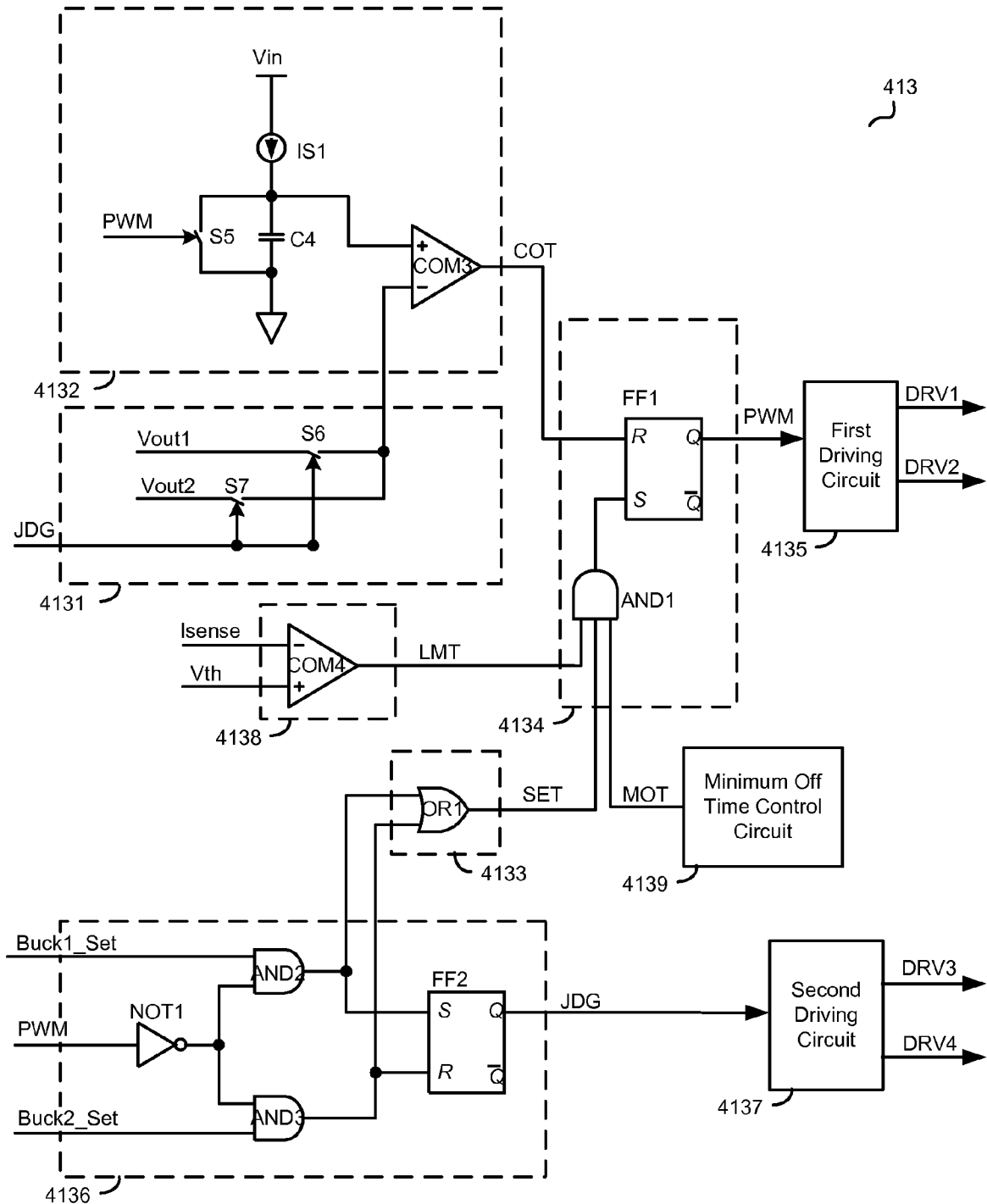
FIG. 5 schematically illustrates the logic circuit 413 in accordance with an embodiment of the present invention.

FIG. 5 schematically illustrates the logic circuit 413 in accordance with an embodiment of the present invention. The selecting circuit 4131 includes switches S6 and S7. Each of the switches S6 and S7 has first terminal, a second terminal and a control terminal. The first terminal of the switch S6 is coupled to the first output voltage Vout1, the first terminal of the switch S7 is coupled to the second output voltage Vout2. The control terminals of the switches S6 and S7 are configured to receive the judge signal JDG. The on time control circuit 4132 comprises a current source IS1, a switch S5, a capacitor C4 and a comparator COM3. The current source IS1 has an input terminal and an output terminal, wherein the input terminal is coupled to the input voltage Vin. The switch S5 has a first terminal, a second terminal and an output terminal, wherein the first terminal is coupled to the output terminal of the current source IS1, the second terminal is coupled to the reference ground, the control terminal is configured to receive the switch control signal PWM. The capacitor C4 has a first terminal and a second terminal, wherein the first terminal is coupled to the output terminal of the current source IS1, the second terminal is coupled to the reference ground. The comparator COM3 has a non-inverting input terminal, an inverting input terminal and an output terminal, wherein the non-inverting input terminal is coupled to the first terminal of the capacitor C4, the inverting input terminal is coupled to the second terminals of the switches S6 and S7, the output terminal is configured to provide the on time control signal COT.

The judging circuit 4136 comprises AND gates AND2, AND3, a NOT gate NOT1 and a flip flop FF2. The NOT gate NOT1 has an input terminal and an output terminal, wherein the input terminal is configured to receive the switch control signal PWM. The AND gate AND2 has a first input terminal, a second input terminal and an output terminal, wherein the first input terminal is configured to receive the first comparison signal Buck1_Set, the second input terminal is coupled to the output terminal of the NOT gate NOT1. The AND gate AND3 has a first input terminal, a second input terminal and an output terminal, wherein the first input terminal is coupled to the output terminal of the NOT gate NOT1, the second input terminal is configured to receive the second comparison signal Buck2_Set. The flip flop FF2 has a set terminal, a reset terminal and an output terminal, wherein the set terminal is coupled to the output terminal of the AND gate AND2, the reset terminal is coupled to the output terminal of the AND gate AND3, the output terminal is configured to provide the judge signal JDG. The logic gate circuit 4133 comprises an OR gate OR1. The OR gate OR1 has a first input terminal, a second input terminal and an output terminal, wherein the first input terminal is coupled to the output terminal of the AND gate AND2, the second input terminal is coupled to the output terminal of the AND gate AND3, the output terminal is configured to provide the gate output signal SET.

The current limiting circuit 4138 comprises a comparator COM4. The comparator COM4 has a non-inverting input terminal, an inverting input terminal and an output terminal, wherein the non-inverting input terminal is configured to receive a threshold voltage Vth, the inverting input terminal is configured to receive a current sensing signal Isense indicative of the inductor current IL, the output terminal is configured to provide the current limit signal LMT. The triggering circuit 4134 comprises a flip flop FF1 and an AND gate AND1. The AND gate AND1 has a first input terminal, a second input terminal, a third input terminal and an output terminal, wherein the first input terminal is coupled to the current limiting circuit 4138 to receive the current limit signal LMT, the second input terminal is coupled to the logic gate circuit 4133 to receive the gate output signal SET, the third input terminal is coupled to the minimum off time control circuit 4139 to receive the minimum off time control signal MOT. The flip flop FF1 has a set terminal, a reset terminal and an output terminal, wherein the set terminal is coupled to the output terminal of the AND gate AND1, the reset terminal is coupled to the on time control circuit 4132 to receive the on time control signal COT, the output terminal is configured to provide the switch control signal PWM.

When the judging circuit 4136 detects that the first comparison signal Buck1_Set is asserted earlier than the second comparison signal Buck2_Set, the flip flop FF2 is set and the judge signal JDG becomes logical high. The second driving circuit 4137 turns on the third switch S3 and turns off the fourth switch S4. At the same time, the switch S6 is turned on and the switch S7 is turned off, the first output voltage Vout1 is sent to the inverting input terminal of the comparator COM3. Based on the input voltage Vin and the first output voltage Vout1, the on time control circuit 4132 generates the on time control signal COT with the first time threshold TON1. Furthermore, the flip flop FF1 is set and the switch control signal PWM becomes logical high. The first driving circuit 4135 turns on the first switch S1 and turns off the second switch S2 until the on time of the first switch S1 reaches the first time threshold TON1.

When the judging circuit 4136 detects that the second comparison signal Buck2_Set is asserted earlier than the first comparison signal Buck1_Set, the flip flop FF2 is reset and the judge signal JDG becomes logical low. The second driving circuit 4137 turns off the third switch S3 and turns on the fourth switch S4. At the same time, the switch S6 is turned off and the switch S7 is turned on, the second output voltage Vout2 is sent to the inverting input terminal of the comparator COM3. Based on the input voltage Vin and the second output voltage Vout2, the on time control circuit 4132 generates the on time control signal COT with the second time threshold TON2. Furthermore, the flip flop FF1 is set and the switch control signal PWM becomes logical high. The first driving circuit 4135 turns on the first switch S1 and turns off the second switch S2 until the on time of the first switch S1 reaches the second time threshold TON2.

Figure 6:
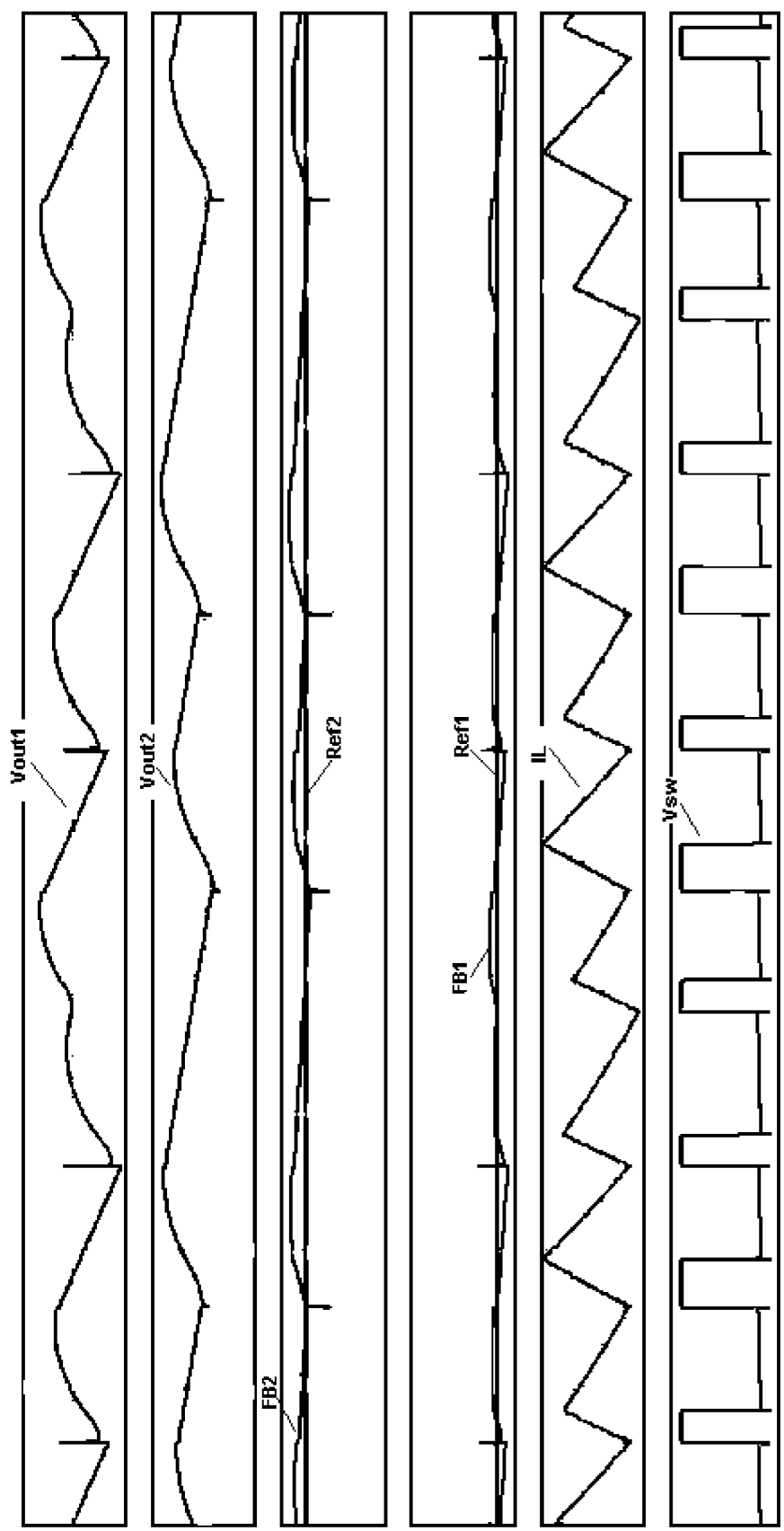
FIG. 6 illustrates working waveforms of the single inductor multiple output buck converter 400.

FIG. 6 illustrates working waveforms of the single inductor multiple output buck converter 400, wherein Vsw represents the voltage at the first terminal of the inductor L1. As shown in FIG. 6, the first buck converter and the second buck converter work in a time-sharing method to realize the regulation of the first output voltage Vout1 and the second output voltage Vout2.

Figure 7:
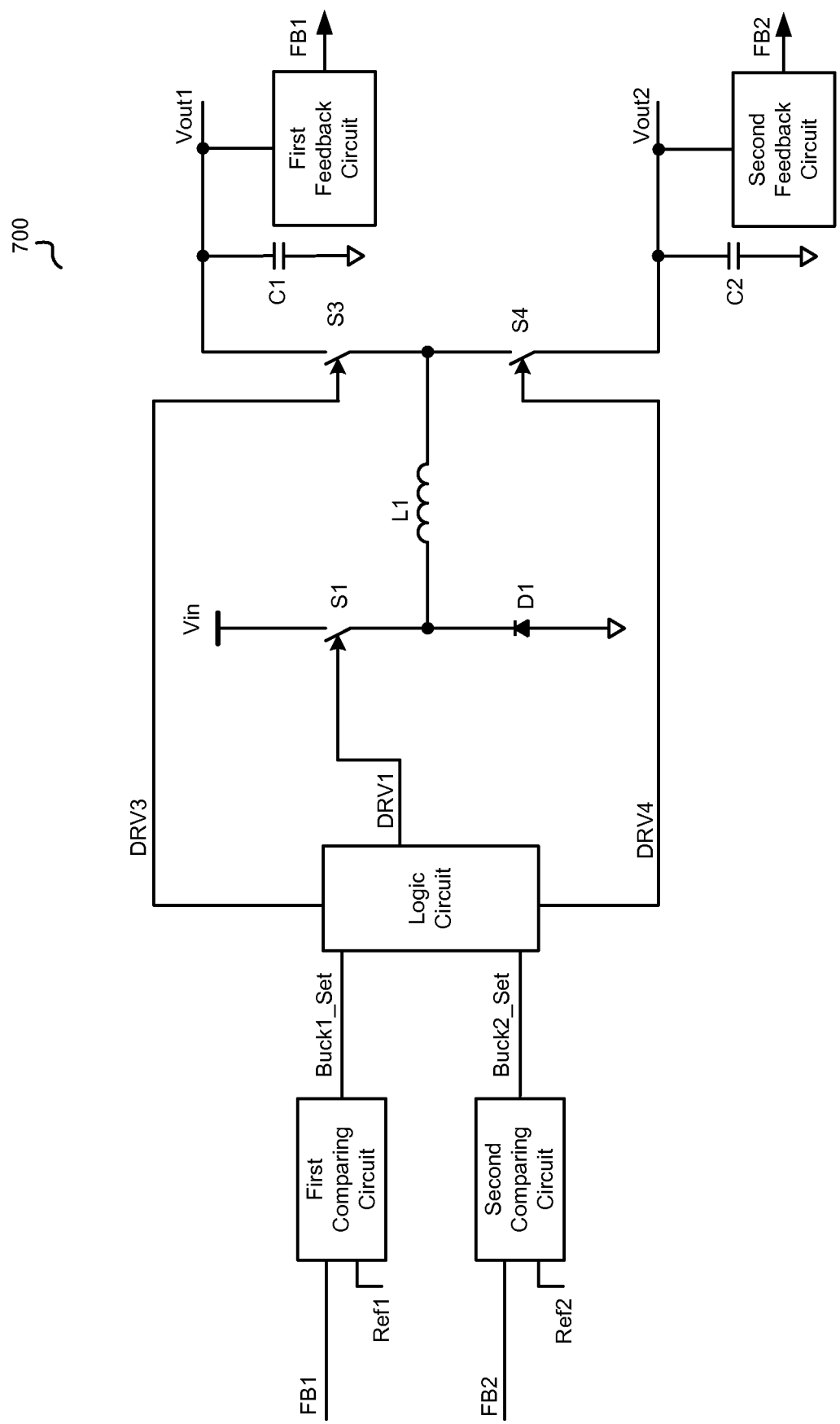
FIG. 7 illustrates a block diagram of a single inductor multiple output buck converter 700 in accordance with an embodiment of the present invention.

FIG. 7 illustrates a block diagram of a single inductor multiple output buck converter 700 in accordance with an embodiment of the present invention, wherein a diode D1 is used to replace the second switch S2.

In the aforementioned embodiments, a converter with dual output is used as an example to explain the working principle of the present invention. However, persons skilled in the art can recognize that it is not intended to limit the invention. The present invention may be used to provide more output through coupling more switches and capacitors to the second terminal of the inductor. In one embodiment, the single inductor multiple output converter comprises an inductor having a first terminal and a second terminal, a first switch coupled between an input voltage and the first terminal of the inductor, a second switch coupled between the first terminal of the inductor and a reference ground, a plurality of output switches with each of the plurality of output switches coupled between the second terminal of the inductor and the corresponding output voltage, a plurality of output capacitors with each of the plurality of capacitors coupled between the corresponding output voltage and the reference ground, a plurality of feedback circuits with each of the plurality of feedback circuits generating a corresponding feedback signal indicative of the corresponding output voltage, and a control circuit. The control circuit comprises a plurality of comparing circuits and a logic circuit. T plurality of comparing circuits generates a plurality of comparison signals, wherein each of the plurality of comparing circuits is configured to compare the corresponding feedback signal with a corresponding reference signal and generate a corresponding comparison signal. The logic circuit is coupled to the plurality of comparing circuits, wherein the logic circuit detects which one of the plurality of comparison signals is asserted first, and controls the first switch, second switch and the plurality of output switches based on the detection result and a plurality of time thresholds. The logic circuit will turn on the output switch corresponding to the comparison signal which is asserted first, and turn off the other output switches. The logic circuit will also turn on the first switch and turn off the second switch, until the on time of the first switch reaches the time threshold corresponding to the comparison signal which is asserted first.

In some embodiments, a ramp compensation signal is added to the feedback signal or subtracted from the reference signal to eliminate sub-harmonic oscillation. Persons with ordinary skill in the art can understand that, such modification does not depart from the spirit and the scope of the invention.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

I claim:

1. A control method of a single inductor multiple output buck converter, wherein the single inductor multiple output buck converter comprises an inductor having a first terminal and a second terminal, a first switch coupled between an input voltage and the first terminal of the inductor, a second switch coupled between the first terminal of the inductor and a reference ground, a third switch coupled between the second terminal of the inductor and a first output voltage, a fourth switch coupled between the second terminal of the inductor and a second output voltage, a first capacitor coupled between the first output voltage and the reference ground, and a second capacitor coupled between the second output voltage and the reference ground, and wherein the control method comprises:

generating a first feedback signal based on the first output voltage;

generating a second feedback signal based on the second output voltage;

comparing the first feedback signal with a first reference signal and generating a first comparison signal;

comparing the second feedback signal with a second reference signal and generating a second comparison signal;

detecting which one of the first comparison signal and the second comparison signal is asserted first; and controlling the first switch, second switch, third switch and fourth switch based on the detection result; wherein when the first comparison signal is asserted earlier than the second comparison signal, the first switch and the third switch are turned on, the second switch and the fourth switch are turned off, wherein the first switch will be turned off and the second switch will be turned on once the on time of the first switch reaches a first time threshold;

when the second comparison signal is asserted earlier than the first comparison signal, the first switch and the fourth switch are turned on, the second switch and the third switch are turned off, wherein the first switch will be turned off and the second switch will be turned on once the on time of the first switch reaches a second time threshold.

2. The control method of claim 1, wherein which one of the first comparison signal and the second comparison signal is asserted first is detected only when the first switch is off.

3. The control method of claim 1, wherein the first switch can only be turned on after its off time reaches a minimum off time threshold.

4. The control method of claim 1, further comprising:
comparing the current flowing through the inductor with a current limit value; wherein
the first switch can only be turned on when the current flowing through the inductor is smaller than the current limit value.

5. The control method of claim 1, wherein the second switch is replaced by a diode.

6. A control circuit used in a single inductor multiple output buck converter, wherein the single inductor multiple output buck converter comprises an inductor having a first terminal and a second terminal, a first switch coupled between an input voltage and the first terminal of the inductor, a second switch coupled between the first terminal of the inductor and a reference ground, a third switch coupled between the second terminal of the inductor and a first output voltage, a fourth switch coupled between the second terminal of the inductor and a second output voltage, a first capacitor coupled between the first output voltage and the reference ground, and a second capacitor coupled between the second output voltage and the reference ground, and wherein the control circuit comprises:

a first comparing circuit having a first input terminal, a second input terminal and an output terminal, wherein the first input terminal is configured to receive a first feedback signal indicative of the first output voltage, the second input terminal is configured to receive a first reference signal, and wherein the first comparing circuit compares the first feedback signal with the first reference signal and generates a first comparison signal at the output terminal;

a second comparing circuit having a first input terminal, a second input terminal and an output terminal, wherein the first input terminal is configured to receive a second feedback signal indicative of the second output voltage, the second input terminal is configured to receive a second reference signal, and wherein the second comparing circuit compares the second feedback signal with the second reference signal and generates a second comparison signal at the output terminal; and a logic circuit coupled to the output terminals of the first comparing circuit and the second comparing circuit, wherein the logic circuit detects which one of the first comparison signal and the second comparison signal is asserted first, and wherein based on the detection result, the logic circuit generates a first driving signal, a second driving signal, a third driving signal and a fourth driving signal to respectively control the first switch, second switch, third switch and fourth switch; wherein when the first comparison signal is asserted earlier than the second comparison signal, the logic circuit turns on the first switch and the third switch, turns off the second switch and the fourth switch, wherein the logic circuit will turn off the first switch and turn on the second switch once the on time of the first switch reaches a first time threshold;

when the second comparison signal is asserted earlier than the first comparison signal, the logic circuit turns on the first switch and the fourth switch, turns off the second switch and the third switch, wherein the logic circuit will turn off the first switch and turn on the second switch once the on time of the first switch reaches a second time threshold.

7. The control circuit of claim 6, wherein the logic circuit comprises:

a judging circuit having a first input terminal, a second input terminal and an output terminal, wherein the first input terminal is coupled to the output terminal of the first comparing circuit to receive the first comparison signal, the second input terminal is coupled to the output terminal of the second comparing circuit to receive the second comparison signal, and wherein the judging circuit detects which one of the first comparison signal and the second comparison signal is asserted first, and generates a judge signal at the output terminal;

a selecting circuit having a first input terminal, a second input terminal, a third input terminal and an output terminal, wherein the first input terminal is configured to receive the first time threshold, the second input terminal is configured to receive the second time threshold, the third input terminal is coupled to the output terminal of the judging circuit to receive the judge signal, and wherein based on the judge signal, the selecting circuit provides the first time threshold or the second time threshold to the output terminal as an on time threshold;

an on time control circuit having an input terminal and an output terminal, wherein the input terminal is coupled to the output terminal of the selecting circuit to receive the on time threshold, and wherein based on the on time threshold, the on time control circuit generates an on time control signal at the output terminal;

a logic gate circuit having a first input terminal, a second input terminal and an output terminal, wherein the first input terminal is couple to the output terminal of the first comparing circuit to receive the first comparison signal, the second input terminal is coupled to the output terminal of the second comparing circuit to receive the second comparison signal, and wherein based on the first comparison signal and the second comparison signal, the logic gate circuit generates a gate output signal at the output terminal;

a triggering circuit having a first input terminal, a second input terminal and an output terminal, wherein the first input terminal is couple to the output terminal of the on time control circuit to receive the on time control signal, the second input terminal is coupled to the output terminal of the logic gate circuit to receive the gate output signal, and wherein based on the on time control signal and the gate output signal, the triggering circuit generates a switch control signal at the output terminal;

a first driving circuit having an input terminal, a first output terminal and a second output terminal, wherein the input terminal is coupled to the output terminal of the triggering circuit to receive the switch control signal, and wherein based on the switch control signal, the first driving circuit respectively generates the first driving signal and the second driving signal at the first output terminal and the second output terminal; and a second driving circuit having an input terminal, a first output terminal and a second output terminal, wherein the input terminal is coupled to the output terminal of the judging circuit to receive the judge signal, and wherein based on the judge signal, the second driving circuit respectively generates the third driving signal and the fourth driving signal at the first output terminal and the second output terminal.

8. The control circuit of claim 7, wherein the judging circuit is further coupled to the output terminal of the triggering circuit to receive the switch control signal, and wherein based on the switch control signal, the judging circuit detects which one of the first comparison signal and the second comparison signal is asserted first only when the first switch is off.

9. The control circuit of claim 6, wherein the logic circuit further comprises:
 a minimum off time control circuit configured to generate a minimum off time control signal to control the minimum off time of the first switch; wherein
 the triggering circuit is further coupled to the minimum off time control circuit, and generates the switch control signal based on the gate output signal, minimum off time control signal and on time control signal.

10. The control circuit of claim 6, wherein the logic circuit further comprises:
 a current limiting circuit configured to compare the current flowing through the inductor with a current limit value and generate a current limiting signal;
 wherein the triggering circuit is further coupled to the current limiting circuit, and generates the switch control signal based on the gate output signal, current limiting signal and on time control signal.

11. The control circuit of claim 6, wherein the second switch is replaced by a diode.

12. A single inductor multiple output buck converter configured to provide a plurality of output voltage, comprising:
 an inductor having a first terminal and a second terminal;
 a first switch coupled between an input voltage and the first terminal of the inductor;
 a second switch coupled between the first terminal of the inductor and a reference ground;
 a plurality of output switches with each of the plurality of output switches coupled between the second terminal of the inductor and the corresponding output voltage;
 a plurality of output capacitors with each of the plurality of capacitors coupled between the corresponding output voltage and the reference ground;
 a plurality of feedback circuits generating a plurality of feedback signals, wherein each of the plurality of feedback circuits is configured to generate a corresponding feedback signal indicative of the corresponding output voltage;
 a plurality of comparing circuits generating a plurality of comparison signals, wherein each of the plurality of comparing circuits is configured to compare the corresponding feedback signal with a corresponding reference signal and generate a corresponding comparison signal; and
 a logic circuit coupled to the plurality of comparing circuits, wherein the logic circuit detects which one of the plurality of comparison signals is asserted first, and controls the first switch, second switch and the plurality of output switches based on the detection result.

13. The single inductor multiple output buck converter of claim 12, wherein the second switch is replaced by a diode.

* * * * *